(12) United States Patent
Watanabe et al.

(10) Patent No.: US 7,966,867 B2
(45) Date of Patent: Jun. 28, 2011

(54) SCANNING PROBE MICROSCOPE

(75) Inventors: Masahiro Watanabe, Yokohama (JP);
Shuichi Baba, Yokohama (JP);
Toshihiko Nakata, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 564 days.

(21) Appl. No.: 12/099,176

(22) Filed: Apr. 8, 2008

(65) Prior Publication Data
US 2008/0257024 A1 Oct. 23, 2008

(30) Foreign Application Priority Data

Apr. 10, 2007 (JP) ............................... 2007-102972
Feb. 13, 2008 (JP) ............................... 2008-031705

(51) Int. Cl.
*G01B 5/28* (2006.01)
(52) U.S. Cl. .............. 73/105; 116/275; 850/30; 850/55; 850/39; 850/40; 850/41
(58) Field of Classification Search .................... 73/105; 116/275
See application file for complete search history.

(56) References Cited

U.S. PATENT DOCUMENTS

| 5,714,756 A * | 2/1998 | Park et al. ................. 850/6 |
| 7,350,404 B2 * | 4/2008 | Kurenuma et al. ......... 73/105 |

FOREIGN PATENT DOCUMENTS

| JP | 2001-33373 | 2/2001 |
| JP | 2004-132823 | 4/2004 |

* cited by examiner

*Primary Examiner* — Hezron Williams
*Assistant Examiner* — Rodney T Frank
(74) *Attorney, Agent, or Firm* — Antonelli, Terry, Stout & Kraus, LLP.

(57) ABSTRACT

The invention provides a scanning probe microscope capable of performing highly accurate three-dimensional profile measurement in a state in which no sliding of the probe or deformation of the sample substantially occurs. The present invention realizes a highly accurate three-dimensional profile measurement using a scanning probe microscope, in which the method performs measurement to obtain an accurate three-dimensional profile without causing damage to the sample by having the probe contact the sample at the measurement point and then move to a next measurement point, wherein the probe is pulled up and retracted temporarily and then moved to the next measurement point where it is approximated to the sample again, the method comprises analyzing the signals of the contact force sensor so as to obtain the height of the probe at the time when the probe contacts the sample with zero contact force, so as to substantially eliminate errors caused by sliding of the probe and deformation of the sample caused by minute contact force.

13 Claims, 12 Drawing Sheets

SLIDE   ATTRACTION $d\theta = kdx$

SCANNING PROBE MICROSCOPE

The present application is based on and claims priority of Japanese patent application No. 2007-102972 filed on Apr. 10, 2007 and No. 2008-31705 filed on Feb. 13, 2008, the entire contents of which are hereby incorporated by reference.

BACKGROUND OF THE INVENTION

1. Field of the Invention

The present invention relates to a scanning probe microscope capable of performing accurate profile measurement of samples including steep sloped surfaces and soft materials.

2. Description of the Related Art

Scanning probe microscopes (SPM) have been known for measuring microscopic three-dimensional profiles. The art of scanning probe microscopes relates to controlling a probe having a pointed tip to scan samples while maintaining an extremely small contact force, which is used extensively for measuring atom-order microscopic three-dimensional profiles.

On the other hand, dimensional control using CD-SEM (length measurement SEM) is performed currently in the process of forming microscopic patterns on an LSI, but as the patterns are being scaled-down in size, the following problems of limitations have become evident. The first problem relates to measurement accuracy. The gate width of a 45-nm node LSI, which is considered to be the mainstream in the future, is 25 nm, and the required measurement accuracy thereof is 0.5 nm, assuming that the permissible variation is 10% and the measurement accuracy is 20% thereof. The second problem relates to the demand of profile measurement. The necessity of APC (advanced process control) for highly accurate control of line width has increased, which requires a measurement method for measuring not only the pattern line width but also the cross-sectional profile that influences the electrical characteristics greatly. The third problem relates to the measurement object. There are increasing needs for measuring materials having little tolerance to electron beams, such as a DUV (deep ultra violet) resist or a low-k (low-dielectric constant) film material. Further, similar measurement needs such as measurement accuracy, need for profile measurement and need for resist pattern measurement for creating masters exist in the measurement of pits of next-generation high-density optical disk memories.

The art of scanning probe microscopes is considered promising in solving the above-described problems. However, since semiconductor patterns have an extremely high aspect ratio, there are drawbacks in that the measured profile data are deformed since the probe cannot follow the vertical movement of a steep sloped surface or since the probe slides on the steep sloped surface during probe scanning. Further, there are drawbacks in that the object to be measured is deformed by the contact force, and the quantity of deformation differs between a soft material and a hard material, so that error occurs in the measured profile when a sample including different surface materials is measured.

With respect to these problems, Japanese patent application laid-open publication No. 2001-33373 (patent document 1) and No. 2004-132823 (patent document 2) discloses scanning methods of approximating the probe to the sample at discrete sampling positions and measuring the height at these positions when the contact force becomes constant, and then retracting the probe to move the probe to the next measurement point where the same measurement process is repeatedly performed. The disclosed methods overcome the problem of error caused by the probe not capable of following the vertical movement on a steep sloped surface, since the probe is not dragged by these methods. However, since the probe is driven toward the sample until the contact force reaches a constant value, the minute contact force still causes slight deformation of the sample or sliding of the probe, which causes error in the measured profile.

As described above, the prior art methods had drawbacks such as deteriorated measurement accuracy caused by the probe sliding on steep sloped surfaces on a sample having a high aspect ratio or by deformation of the sample including soft materials.

SUMMARY OF THE INVENTION

The object of the present invention is to solve the problems of the prior art by providing a scanning probe microscope capable of performing highly accurate three-dimensional profile measurement by eliminating the influence of sliding of the probe or deformation of the sample.

The present invention solves the above problems by providing a measurement method capable of realizing highly accurate measurement of samples having a high aspect ratio without causing damage to the sample. The present invention realizes a highly accurate three-dimensional profile measurement using a scanning probe microscope by adopting a measurement method of repeatedly approximating and retracting a probe at multiple sampling positions, wherein the height of the probe at the moment when the probe contacts the sample with zero contact force is obtained by analyzing the signal from a contact force detection sensor so as to suppress errors caused by the sliding of the probe and the deformation of the sample caused by the minute contact force.

DETAILED DESCRIPTION OF THE PREFERRED EMBODIMENTS

The preferred embodiments of the present invention will now be described with reference to the drawings.

Embodiment 1

Figure 1:
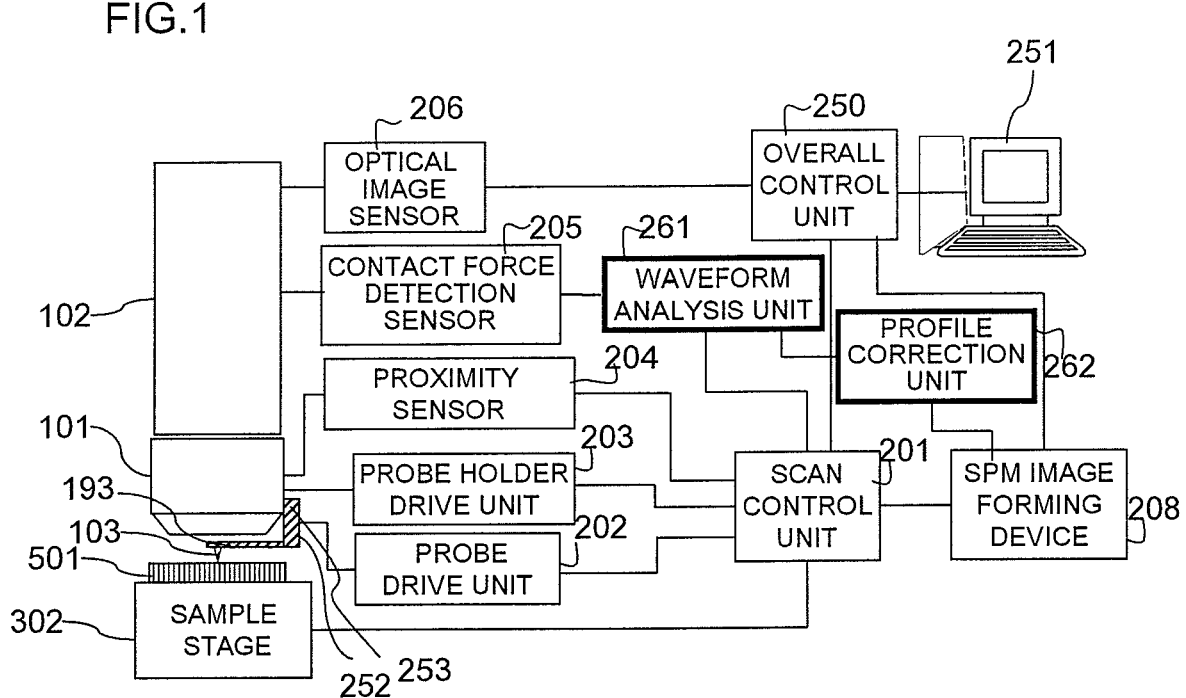
FIG. 1 is a view showing the overall configuration of a scanning probe microscope.

FIG. 1 is a view showing the configuration of a scanning probe microscope according to the present invention. A sample 501 is placed on a sample stage 302 capable of being moved in X, Y and Z directions, and the movement of the sample stage is controlled via a scan control unit 201. Above the sample is a probe 103, and the scanning performed by the scanning probe microscope via the probe is performed by driving a probe movement mechanism 252 having a cantilever 193 with the probe 103 formed at one end thereof in X, Y and Z directions via control from a probe drive unit 202. A probe movement mechanism 252 is attached to a probe holder 110, and the probe holder 101 is mounted via a probe holder elevation mechanism 253 to a lens tube 102, and moved in coarse motion to the Z direction via control from a probe holder drive unit 203.

The probe movement mechanism 252 is a micromotion mechanism having a small moving distance, so that the approximation of the probe to the sample is performed via the probe holder elevation mechanism 253. In another example, the probe can be approximated to the sample by driving the sample stage 302. Further, the probe scanning performed in the scanning probe microscope in the X and Y directions can also be performed by driving the sample stage 302. Furthermore, the Z-direction probe control during the XY scan can also be performed by driving the sample stage 302. An proximity sensor 204 in the Z direction is a sensor for measuring the height of the portion around the tip of the probe with high sensitivity, and by detecting the contact of the probe to the sample in advance and controlling the approximation speed, it becomes possible to approximate the probe at high speed to the sample without causing collision with the sample. The proximity sensor 204 can utilize light, as described in detail later, or other sensing means, as long as it has a detection range of over several tens of micrometers and capable of detecting the distance from the sample with a sensitivity of approximately one micrometer. For example, a capacitance sensor for measuring the electrostatic capacitance can be used to detect the distance by supplying AC voltage between the probe holder 101 or the cantilever 193 and the sample 501, or an air micrometer for feeding air between the probe holder 101 and the sample 501 can be used to detect the pressure.

The scan control unit 201 controls a contact force detection sensor 205 for detecting the contact force of the cantilever 193, the proximity sensor 204, the probe holder drive unit 203, the probe drive unit 202 and the sample stage 302 to perform operations such as the approximation of the probe and the scanning of the sample. At this time, by sending signals during scanning of the sample to an SPM image forming device 208, the surface profile image of the sample can be obtained. As described in detail later, a waveform analysis unit 261 analyzes the contact force signals output from the contact force detection sensor 205 to detect the contact status of the probe and the sample, and sends the result to the scan control unit 201 and a profile correction unit 262. The scan control unit 201 performs control and switching of control of the probe drive unit 202 using this signal, and the profile correction unit 262 receives the analysis result from the waveform analysis unit 261, computes the correction data of the SPM image and sends the same to the SPM image forming device 208 to correct the SPM image.

When an objective lens is built onto the probe holder 101, an optical image sensor 206 can be used to obtain the optical image of the sample, which can be used to simultaneously observe the SPM measurement area and to perform alignment operation when attaching the probe 103. The operation of the whole apparatus is controlled via an integral control unit 250, and a display/input unit 251 can be used to receive orders from an operator or display optical and SPM images.

Figure 2:
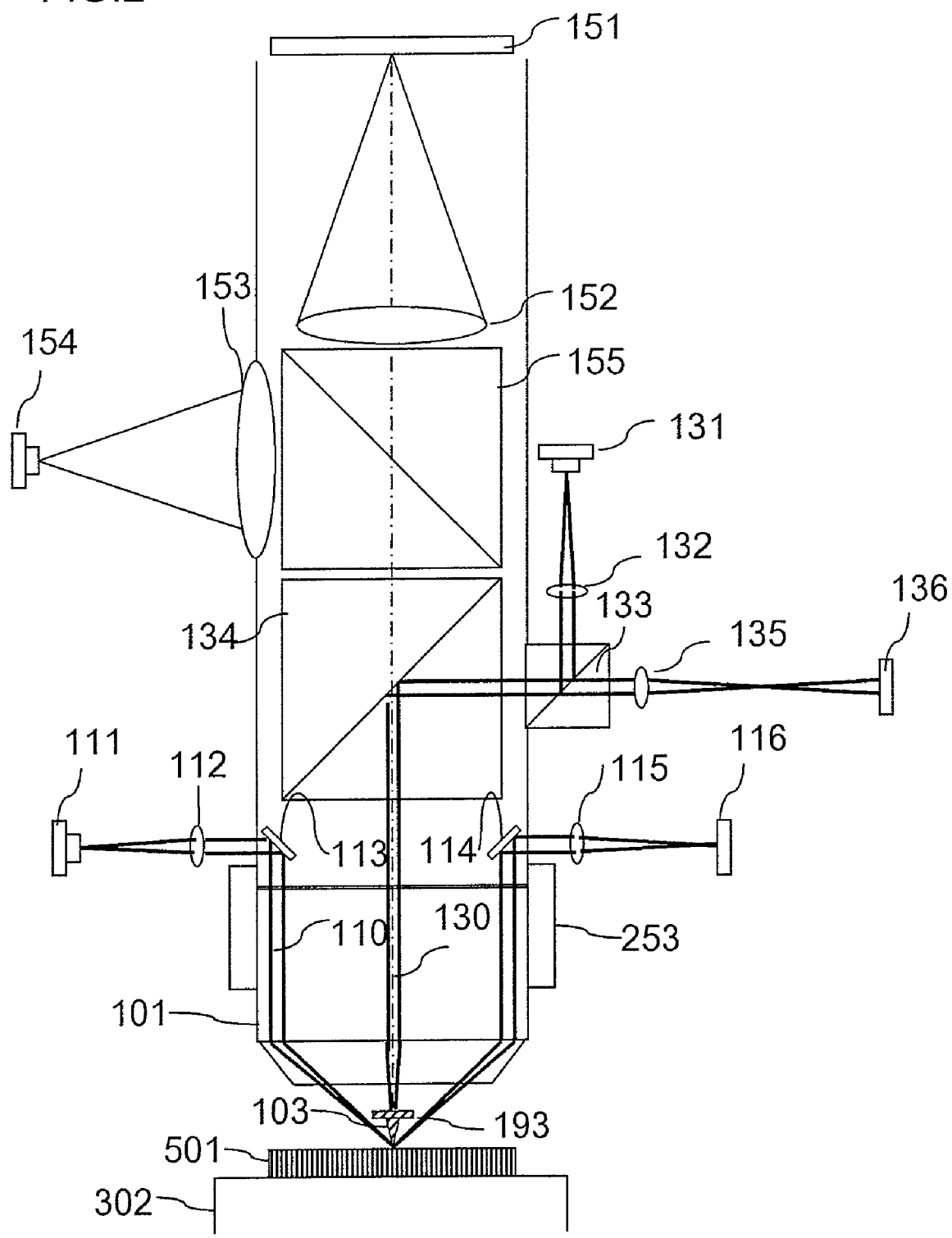
FIG. 2 is an enlarged view showing one embodiment of the circumference of a probe.

FIG. 2 is a view showing an embodiment of the optical system of the invention. The light emitted from a light source 111 is turned into parallel light via a lens 112, reflected on a mirror 113, enters an objective lens formed in the interior of the probe holder 101, and is focused on the sample 501. An image with an arbitrary shape such as a spot or a slit can be formed, depending on the shape of the opening formed in the light source 111. The light reflected on the sample is passed through the objective lens again, reflected on a mirror 114, and produces an image on a detector 116 via an imaging lens 115. The position of the image moves in correspondence to the height of the sample.

The travel distance of the image is 2mZ tan θ when the incidence angle of detection light 110 to the sample is θ, the imaging magnification via the lens 115 is m, and the height of the sample is Z, so by measuring this travel distance, it becomes possible to detect the height Z of the sample. The detector 116 can be a PSD (position sensitive device), a split photodiode, a linear image sensor, or any other device as long as the position of the image is detectable. The above description is based on an arrangement in which the detection light 110 is passed through the objective lens, but it is also possible to adopt an arrangement in which the detection light 110 is passed through the exterior of the objective lens, bent via another mirror not shown to produce an image on the sample. At this time, lens 112 and lens 115 are each aligned so that the light source 111 and the detector 116 are of imaging relationship with the sample 501. In this case, the travel distance of the image on the detector 116 is 2mZ sin θ. The proximity sensor 204 utilizes this relationship to process the output of the detector 116 and to output the sample height.

Now, the contact force detection sensor 205 will be described. The light output from a light source 131 is passed through a lens 132 and a beam splitter 134, and then further passed through a beam splitter 134 to be transmitted through the objective lens and irradiated on the cantilever 193. The light reflected on the cantilever passes the same path to be transmitted through a beam splitter 133 and irradiated on a detector 136 via a lens 135. The lens 135 is arranged so that the exit pupil of the objective lens and the detector 136 are of imaging relationship, and thus, the change of position proportional to the gradient of the reflection surface of the cantilever 193 occurs to the light on the detector 136.

The gradient, or deflection, of the cantilever can be detected by detecting the above-mentioned change of position by a PSD (position sensitive device), a split photodiode, a linear image sensor or the like disposed on the position of the detector 136. When a PSD or a split photodiode is used as the photodetector, the contact force detection sensor 205 calculates the difference of the output from both ends of the cantilever, and normalizes the difference by the sum, so as to convert the detected value into a degree of deflection. When a linear image sensor is used, the position of the laser spot is calculated based on the linear image data, so as to convert the detected value into a degree of deflection and output the same. The degree of deflection can be converted into a contact force in the vertical direction of the probe applied between the cantilever and the sample according to a constant of spring of the cantilever. Furthermore, by using a two-dimensional PSD, an image sensor or a quadrant photodiode, it becomes possible to detect torsion and deflection at the same time. The torsion is converted into a lateral force applied between the probe and the sample. In order to isolate the present detection light 130 from lights of the sample observation system, it is preferable to use a monochromatic laser as the light source 131, and to provide an interference filter in front of and behind the lens 135 so as to transmit this light only.

In another method, it is possible to measure the contact force applied between the cantilever and the sample by vibrating the cantilever and detecting the changes such as the amplitude, phase and frequency of the vibration conditions, instead of using the deflection quantity itself. The vibration is applied via a piezoelectric element built into the base of the lever 193, or via a piezoelectric element built into the probe drive unit 202, or by irradiating intensity-modulated laser to the cantilever.

Furthermore, in order to improve the efficiency, the beam splitter 134 can be a dichroic mirror. Further, the beam splitter 133 can be a polarization beam splitter, wherein the polarization direction of the laser 131 can be an S-polarized light reflected by the beam splitter 133, and by placing a ¼ wavelength plate (not shown) between the beam splitters 133 and 134, the S-polarized light can be converted into a circular polarized light, which is reflected on the reflection surface of the cantilever 193, then the reflected light is converted into a P-polarized light by the ¼ wavelength plate again and then transmitted through the polarization beam splitter 133.

A sample observation system emits light from an illuminating light source 154, which is passed through a condenser lens 153, reflected on a beam splitter 155, transmitted through a beam splitter 134, passed through the objective lens built in the probe holder 101 to illuminate the sample 501. The reflected light from the sample is transmitted again through the objective lens, and through the beam splitters 134 and 155 to produce an image via an imaging lens 152, which is detected by an image sensor 151 and converted into a digital image data by an optical image sensor 206.

As described above with reference to FIG. 2, it is possible to realize simultaneous observation of the SPM measurement position, the facilitation of alignment of the cantilever and high-speed approximation of the probe and the sample, by coaxially arranging the probe, the sample observation system, the sample height sensor and the optical system for detecting the cantilever contact force. Moreover, by coaxially arranging the optical system for detecting the cantilever contact force, the detection light 130 can be irradiated even if the width of the cantilever is small, so that the speed of the scanning operation can be increased by utilizing a cantilever having a lighter weight and higher resonance frequency. By performing all the detection through the objective lens, the objective lens and the cantilever can be approximated, and therefore, it becomes possible to perform optical observation of the sample with high resolution. On the other hand, according to another example, it is possible to use an objective lens having a long operating distance, and to adopt an off-axis arrangement in which at least either the sample height sensor or the cantilever contact force sensor projects and detects light from an angle through the clearance between the objective lens and the sample. This embodiment is described in detail later with reference to FIG. 2.

According to another arrangement, it is possible to build into the cantilever 193 a strain gauge or other devices capable of providing signals reflecting the change of deflection of the cantilever, and to utilize the same instead of the optical contact force sensor. According to yet another arrangement, it is possible to detect the position of the tip of the cantilever 193 or the vibration status thereof using signals generated by having the reflected laser light reflected on the cantilever 193 interfere with a reference laser.

Further according to the present description, it is assumed that the sample 501 is placed below the probe 103, but it is also possible to place the sample 501 above the probe 103, and in that case, the direction of the Z axis in the present description should be changed to the opposite direction in order to apply the present embodiment. Further according to the present embodiment, the vertical direction is referred to as the Z axis and the horizontal direction is referred to as the X axis and Y axis, but it is also possible to arrange the apparatus illustrated in FIGS. 1 and 2 in a certain angle, such as to tilt the apparatus for 90 degrees, and in that case, the present description can be applied to such example by setting the angle of the X, Y and Z coordinate systems to the same angle as the tilt angle of the apparatus.

Figure 3:
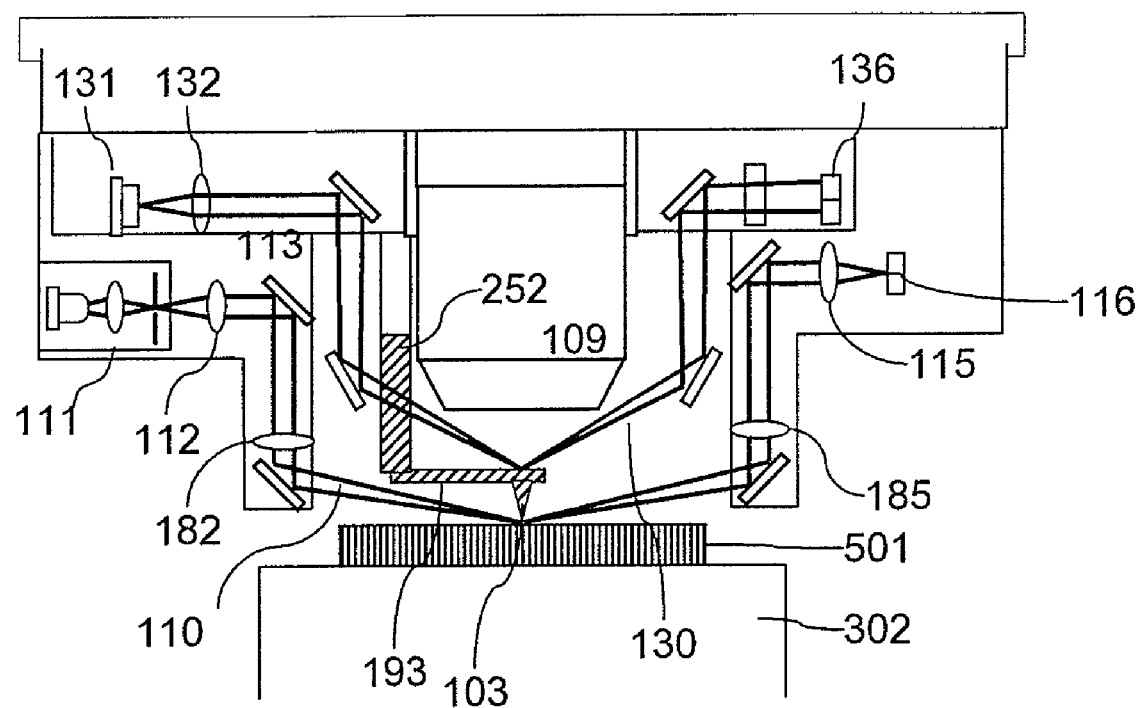
FIG. 3 is a view showing another embodiment of the optical system.

FIG. 3 is a view showing another embodiment of the optical system of the invention. The light emitted from a light source 111 is turned into parallel light via a lens 112, reflected on a mirror 113, enters a lens 182 through reflection via the mirror, and is focused on the sample 501. An image with an arbitrary shape such as a spot or a slit can be formed, depending on the shape of the opening formed to the light source 111. The light reflected on the sample is passed through a lens 185 through reflection via a mirror, and produces an image on a detector 116 via an imaging lens 115. The position of the image moves in correspondence to the height of the sample 501. The travel distance of the image is $2mZ \sin \theta$ when the incidence angle of detection light 110 to the sample is $\theta$, the imaging magnification by the lens 115 is m, and the height of the sample is Z, so that by measuring this travel distance, it becomes possible to detect the height Z of the sample. The detector 116 can be a PSD (position sensitive device), a split photodiode, a linear image sensor, or any other devices as long as the position of the image is detectable.

Now, the contact force detection system of a cantilever 193 according to the embodiment of FIG. 3 will be described. The light output from a light source 131 is passed through a lens 132, and reflected on a mirror to be irradiated on the cantilever 193. The light reflected on the cantilever is reflected on a mirror and irradiated on a detector 136. The deflection of the cantilever 193 changes the angle of the reflected light, and thereby, a change of position proportional to the gradient of the reflection surface of the cantilever occurs to the light spot on the detector 136. The gradient, or deflection, of the cantilever can be detected by detecting the above-mentioned change of position via a PSD (position sensitive device), a split photodiode, a linear image sensor or the like disposed at the position of the detector 136. Furthermore, by using a two-dimensional PSD, an image sensor or a quadrant photodiode, it becomes possible to detect deflection and torsion at the same time. The deflection and torsion corresponds to the contact force in the vertical direction and the horizontal direction, respectively, that operates between the probe and the sample. In order to isolate the present detection light 130 from lights of the sample observation system, it is preferable to use a monochromatic laser as the light source 131, and to place an interference filter in front of the detector 136. Reference number 109 denotes an objective lens of the sample observation system.

Figure 4:
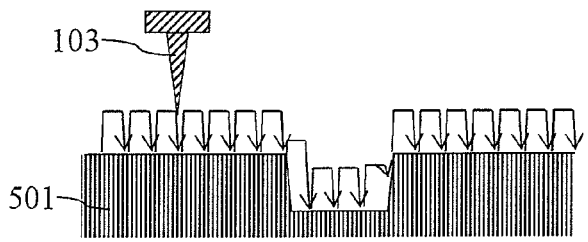
FIG. 4 is a view showing a method for performing scanning via the probe.
Figure 5:
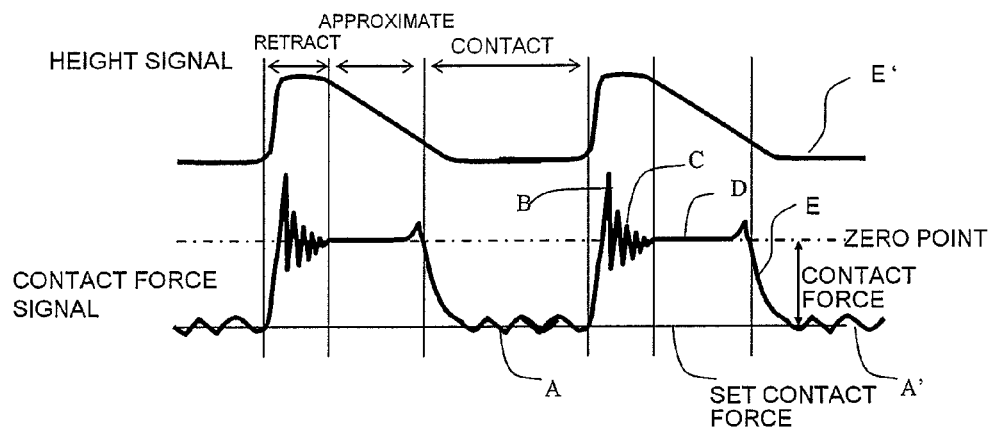
FIG. 5 is a view showing detection signals and a method for controlling the probe according to the prior art.

FIG. 4 is a drawing illustrating the trajectory of the probe in a scan mode suitable for highly accurately measuring a sample with a high aspect ratio. FIG. 5 shows the condition of signals at this time. The horizontal axis shows the time. The upper waveform is of a signal indicating the height of the cantilever 193, which is either the applied voltage of a Z-axis piezoelectric element of the probe movement mechanism 252, or the output signal of a Z-axis displacement detector (denoted by reference number 198 described later with reference to FIGS. 8A and 8B) built into the probe movement mechanism 252. According to another embodiment, the distance between the sample and the probe can be changed using a Z driving mechanism of the sample stage 302, and in that case, a signal denoting the height order of the sample stage 302 or a signal from a height detector not shown built into the sample stage 302 should be used.

The lower waveform is the output signal waveform of the contact force detection sensor 205, wherein the lower portion corresponds to when the probe 103 is pressed against the sample 501, and the upper portion above the dashed-dotted line corresponds to when the probe 103 is attracted to the sample 501. The attraction is caused by Van der Waal's forces or surface tension caused by condensed moisture in the atmosphere. At this time, the relationship between the positive and negative directions of the contact force and the attraction/repulsive force depends on the signs of the signals, so that if the direction in which the attraction works is defined as negative contact force, the following discussions are similarly applicable by reversing all the signs on the numerals related to the contact force and reversing the waveform representing the contact force.

In FIG. 5, the probe 103 is separated from the sample 501 once after performing measurement at each respective measurement point, and then the probe is moved to a next measurement point where the probe 103 and the sample 501 are approximated again until they come in contact with one another, and the height of the probe movement mechanism 252 at a point of time when the contact force reaches a fixed contact state is recorded so as to measure the height of the sample at each point. According to this measurement method, the probe is not dragged on the sample but separated from the sample during lateral movement, so that no lateral force is applied on the probe and no following-movement delay occurs to the probe, so that it becomes possible to measure the three-dimensional profile accurately even of a sample having a steep sloped portion.

When the probe is in contact with the sample, the height of the base of the cantilever is controlled so that the contact force signal shows a constant set contact force, as shown in FIG. 5 (A of FIG. 5). After measuring the height, the probe is temporarily retracted for measurement of the next point, and at this time, the contact force signal temporarily varies toward the positive direction by the attraction force working between the probe and the sample (B of FIG. 5), then after breaking away from the attraction force, the residual vibration of the cantilever 193 appears in the contact force signal (C of FIG. 5), and then the signal is returned to zero point (D of FIG. 5). In parallel to period C of FIG. 5, the probe 103 is moved horizontally to the upper portion of the next measurement point. When the probe restarts the approximation, the signal of the contact force detection sensor is varied toward the negative direction at the moment the probe contacts the sample (E of FIG. 5), and the Z height of the probe movement mechanism 252 is controlled so as to set the signal to correspond to the set contact force (E' of FIG. 5).

Figure 11A:
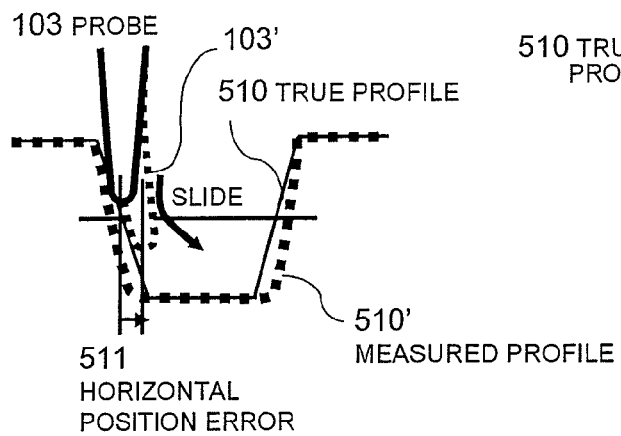
FIGS. 11A and 11B are views showing an aspect of the profile measurement error to be solved by the present invention.

Since the probe is not dragged according to this method, the problem of error caused by the movement of the probe not being able to follow the up-down of a steep sloped surface does not occur. However, since the probe is moved toward the sample to contact the same until the contact force reaches a set contact force, though the contact force is minute, it causes slight sliding of the probe or deformation of the sample. This is further described with reference to FIGS. 11A and 11B. FIG. 11A illustrates the error that may occur on a steep sloped surface. The true surface profile of the sample 501 is shown by a solid line 510. When the surface height of the profile is measured by moving the probe 103 downward from above, if the tip of the probe contacts the steep sloped surface, as shown in FIG. 11A, the sliding of the probe occurs as shown by the dotted line 103'. As a result, the measured height data denotes a point with a positional error in the horizontal direction with respect to the intended measurement position. Therefore, the measured profile is expanded as shown in 510' from the true profile 510.

Figure 11B:
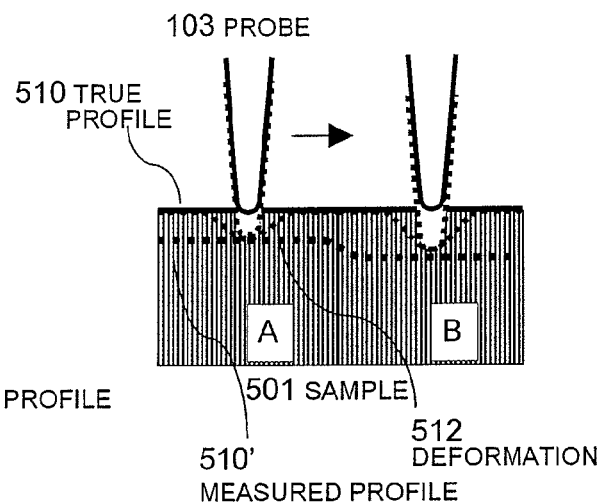

FIG. 11B shows the case in which the surface material of the sample 501 differs between region A and region B. In the example, region B is softer than region A. As illustrated, the minute contact force of the probe 103 to the sample 501 causes the surface of the sample 501 to deform slightly, as shown by the dotted line 512. Since this deformation quantity differs between region A and region B, the measured profile not only has an offset with respect to the true surface profile 510 as shown in 510', but also has a step difference that varies between boundaries of materials.

The set contact force must be set with sufficient allowance to correspond to fluctuations such as noise and drift of the contact force sensor signals, otherwise the approximation movement will not be performed normally if the zero point of the signal fluctuates and falls below the set contact force. There is a drawback in that the contact force cannot be reduced below a certain level. Further, the contact force fluctuates if the zero point fluctuates, so that there is another drawback in that the errors mentioned above caused by the sliding of the probe or the deformation of the sample also fluctuate along with the temporal fluctuation of the zero point.

The present invention relates to a scanning probe control method that essentially does not cause the above-mentioned errors caused by contact force and the fluctuation thereof. According to the essentials of the present invention, by measuring the height of the sample at a point when the contact force between the probe and the sample is essentially zero, the present invention enables to measure the height of the sample immediately after the probe contacts the sample before no sliding or deformation of the sample occurs.

Figure 6:
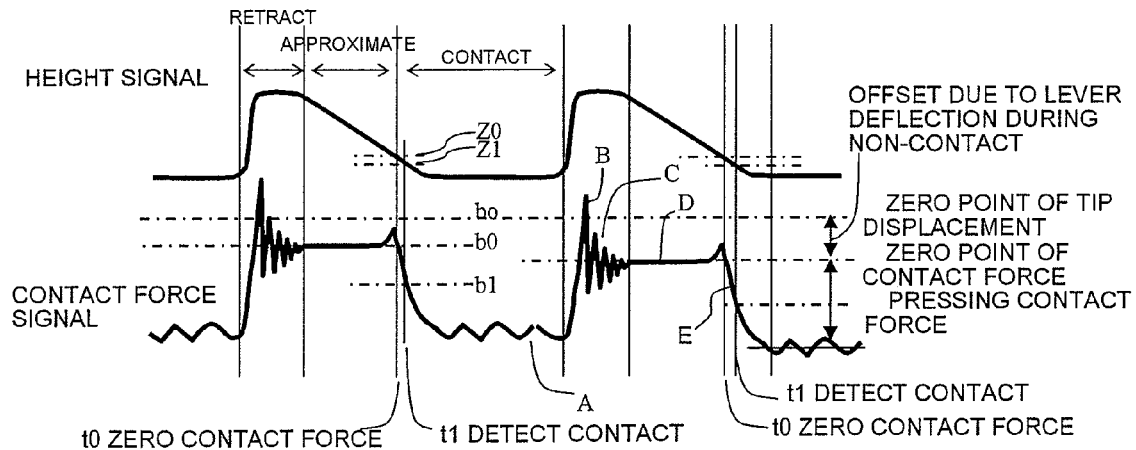
FIG. 6 is a view showing detection signals and a method for controlling the probe according to embodiment 1 of the present invention.
Figure 12:
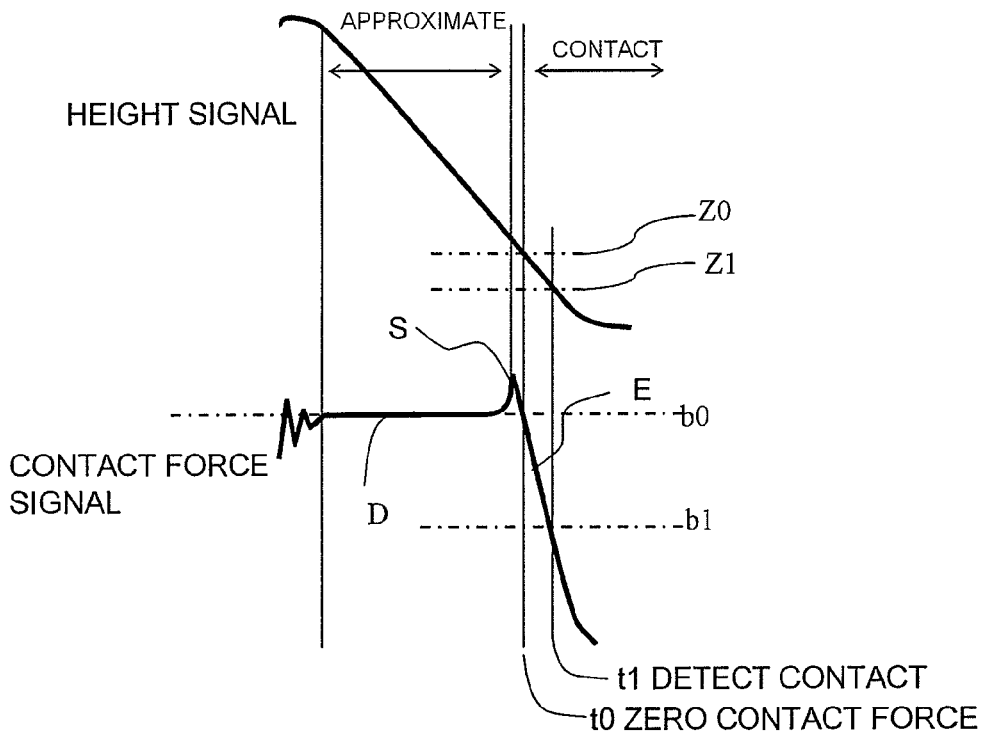
FIG. 12 is an enlarged view of the detection signal waveform before and after the contact of the probe and the sample according to FIG. 6.

At this time, the embodiment of the scanning probe control method according to the present invention will be described with reference to FIG. 6. In addition to FIG. 6, FIG. 12 is an enlarged view of the waveform before and after the probe contacts the sample. Similar to FIG. 5, the horizontal axes of FIG. 6 and FIG. 12 represent time. The upper waveform is of a signal indicating the cantilever height, and the lower waveform corresponds to an output signal waveform of the contact force detection sensor 205. During a period D in which the probe and the sample are not in contact with one another, the signal of the contact force detection sensor 205 is substantially horizontal, while during period E after the probe contacts the sample, the contact force is gradually increased, and the signal of the contact force detection sensor 205 is varied downward. In other words, the rate of change of the contact force signal is varied steeply within this boundary.

Further, as the probe approximates the sample, there often occurs a phenomenon called a snap-in where the probe is attracted toward the sample via Van der Waal's forces or other causes and the probe is stuck to the sample in a deflected manner. In such case, there temporarily appears an horn shape toward the direction opposite from the contact direction as shown in S of FIG. 12 in the output of the contact force detection sensor 205. By detecting such characteristic signal waveform that appears in the output of the contact force detection sensor 205 via a waveform analysis unit 261, it becomes possible to detect the moment of time in which the probe comes into contact with the sample. Actually, the point in which the signal inclination varies greatly should be detected, which is detectable by calculating a secondary differentiation of the contact force signal with respect to time to detect where the result exceeds a threshold. According to another embodiment, the level b0 of the planar portion D of FIG. 12 is calculated by the moving average of the signal or the application of a linear line, and the detection is performed by determining where the signal variation exceeds a certain value from the level b0. More specifically, it is possible to compare the differential value of the signal or the difference from the planar portion b0 with a threshold.

Further, the above-mentioned process should desirably be used together with a filter for removing signal noises. According to another method, the average profile near the point where the inclination varies greatly is recorded, which is pattern-matched with the input signal to detect a time t0 in which the probe contacts the sample by detecting a point where the evaluation of similarity exceeds a certain value or a point where the evaluation of similarity shows the maximum value. Preferably, in order to further accurately detect the point of time where the probe and the sample come into contact with each other with zero contact force, the time of t0 (where the contact force is zero) is detected by calculating the point where the signal crosses the signal planar portion D, and to measure the height Z0 of the base portion of the cantilever 193 at the time t0 so as to record the same as the height of the sample at that point of time. Thereafter, by repeating the process of approximating the probe until the contact force reaches a predetermined contact force (A), retracting the probe again (B) and moving the probe to a next measurement point to approximate the probe again (D), the height profile of the sample can be obtained.

Figure 8A:
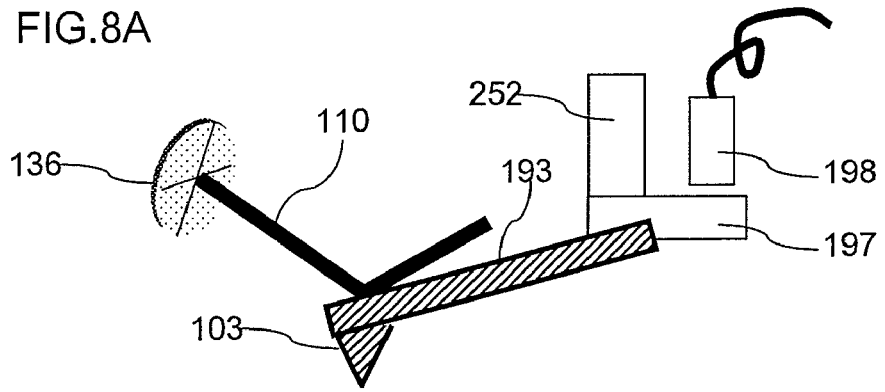
FIGS. 8A and 8B are views showing the method for correcting deflection of the cantilever due to thermal stress or the like according to embodiment 2 of the present invention.

Now, with reference to FIG. 8A, the arrangement for detecting the height of the base unit of the cantilever 193 will be described. The height of the mounting portion 197 of the cantilever 193 is detectable through the voltage applied to a Z-axis piezoelectric element built into the probe micromotion mechanism 252, or via a displacement detector 198 for measuring the height of the cantilever mounting unit 197. It is possible to use a voice coil motor for the probe micromotion mechanism, wherein according to such example, the current value for driving the voice coil motor is proportional to the amount of displacement of the micromotion mechanism, so that the height can be detected by the driving current value of the voice coil motor.

Actually, the detection of time t0 in which the probe and the sample contact one another with zero contact force as described above is somewhat delayed for example by the filter for reducing the noise of the signal used in the waveform analysis unit 261, the differential processing, the threshold processing, the pattern matching process and the maximum point detection process. Therefore, contact is detected at a point of time t1 of FIGS. 6 and 12 having a certain delay from time t0. At time t1, the probe is approximated further to the sample than height Z0 corresponding to t0, and the height thereof is Z1. The contact force becomes b1, which is shifted from level b0 where the contact force is zero. Therefore, it is desirable to obtain height Z0 at time t0 where the probe and the sample contact one another with zero contact force, by compensating for the delay in contact detection.

Therefore, it is desirable to perform the following calculation at a profile correction unit 262 that receives the result of the waveform analysis unit 261. When it is assumable that the delay from the time when the probe and the sample contact one another with zero contact force to when the contact of the probe is detected ($\Delta T$) is constant and that the distance between the probe and the sample is approximated at constant speed, the correction height Z0 at a point of time when the contact force of the probe and the sample is substantially zero can be obtained by the following:

$$\text{Correction height } Z0 = \text{cantilever mounting portion height}(t=t1) - \text{approximation speed} \cdot \Delta T$$

When the approximation speed of the probe and the sample is not constant, the correction height Z0 at the point of time when the contact force of the probe and the sample is substantially zero can be obtained by the following:

$$\text{Correction height } Z0 = \text{cantilever mounting portion height}(t=t1-\Delta T)$$

Actually, however, the delay in contact detection $\Delta T$ is not constant. That is, in the above method where the differential value of the contact force signal is compared with the threshold value, the following phenomenon occurs. When a so-called snap-in phenomenon occurs significantly, the output of the contact force detection sensor 205 temporarily moves in the direction opposite from the contact direction, then varies in the contact direction, and when the probe approximates the sample by the attraction distance from the point of time of snap-in, the contact force becomes zero. Since an horn-shaped horn-like protruded shape as shown in S in FIG. 12 appears in the output, the contact force is changed from positive state to negative inclination. Therefore, since the differential value of the contact force signal falls below the negative threshold value, contact can be detected.

When no snap-in occurs, the contact force signal starts to vary toward the negative direction for the first time after the time of contact, so that due to delays caused by differential processing and signal smoothing filter, the time when contact force becomes zero has already passed at the point of time when contact is detected. Further, for example, according to the above-described method where the difference between the planar portion b0 of the contact force signal is compared with the threshold value, the delay time of contact detection fluctuates if the rate of change of contact force after contact fluctuates. Even when the distance between the probe and the sample is approximated at a constant speed, the variation speed of contact force fluctuates by the elastic modulus of the sample surface.

In other words, as illustrated in FIG. 11B, when the sample is soft, the surface of the sample 501 is compressed by the contact force with the probe 103, so that compared to when the sample surface has a significantly large constant of spring compared to that of the cantilever 193, the variation speed of contact force is reduced. Therefore, the delay time (Δt) from when the contact force signal is zero to when the difference with the planar portion b0 of the contact force signal exceeds a threshold value is elongated.

The following describes another embodiment to cope with the above-mentioned phenomenon in which ΔT fluctuates. The signal values of the contact force signal and the probe height signal of the immediately preceding given period of time are constantly retained in the waveform analysis unit 261. When the profile correction unit 262 detects contact, the probe height signal retained in the waveform analysis unit 261 is read out to search for the data immediately subsequent to the time where the contact force signal turns downward from zero level b0. The searched data is set at the head, and at least two points of contact force signal value data are obtained to apply a linear line to the data, so as to obtain via extrapolation the time when the contact force signal crosses b0. The above-described time does not usually correspond to the sample point of the height signal data, so at least two points of height signal data at sample points in the vicinity thereof are used, and based on these data, the height signal value at the point of time when the contact force signal crosses b0 is obtained via interpolation. Moreover, when snap-in occurs and the projection of contact force signal as shown in S of FIG. 12 appears, the contact force signal crosses b0, so that the time when the contact force signal crosses b0 can be obtained via interpolation using signal data preceding the crossing point.

The profile correction unit 262 hands over this result to the SPM image forming device 208, and the SPM image forming device 208 uses the drive data of the probe drive unit 202 and the sample stage 252 received from the scan control unit 201 and the correction data received from the profile correction unit 262 to form the SPM image, and the overall control unit 250 receives this image and displays the same on the display unit 251.

The process is described in further detail using expressions. When the point of time when contact force becomes zero is t0, the sample point of contact force signal immediately following t0 is ta, and the sampling interval is ts, then ta+ts·n (n=0 ... N) are the data sampling points subsequent to the time when contact force becomes zero. Further, ta+ts·n (n=−1 ... M) are the data sampling points preceding the time when the contact force becomes zero. When the contact force signal at time t is b(t) and the height signal is z(t), it is possible to obtain the time t0 crossing b0 via extrapolation or interpolation of b(ta+ts·n), and to obtain z(t0) via interpolation of z(ta+ts·n).

If there is a large amount of noise in the data, a large number of data should be used for interpolation and extrapolation. On the other hand, if only the data close to the time when the probe and the sample contact one another with zero contact force is to be used, a small number of data should be used. For example, if the two points immediately subsequent to the time when the probe and the sample contact one another with zero contact force is to be used, the time t0 of the crossing point with b0 is calculated via extrapolation using data b(ta) and b(ta+ts) as follows:

$$t0=ta+ts \cdot (b0-b(ta))/(b(ta+ts)-b(ta))$$

When the two points before and after the time when the probe and the sample contact one another with zero contact force are to be used, the time t0 of the crossing point with b0 is calculated via interpolation using data b(ta−ts) and b(ta) as follows:

$$t0=ta+ts \cdot (b0-b(ta))/(b(ta)-b(ta-ts))$$

Next, using the calculated value of t0 and the height signal data z(ta−ts) and z(ta) before and after t0, the height z0 at time t0 is calculated via interpolation as follows:

$$z0=z(ta)+(z(ta)-z(ta-ts)) \cdot (t0-ta)/ts$$

If three or more points are to be used, a straight line is applied to a group of data (ta+ts·n, b(ta+ts·n)), and when assuming that the expression is bf(t)=c·t+d, the time t0 when bf(t) crosses b0 is calculated as follows:

$$t0=(b0-d)/c$$

The height signal at time t0 can be calculated by applying a straight line to a group of data (ta+ts·n, z(ta+ts·n)), and when assuming that the expression is zf(t)=e·t+g, the height z0 at time t0 is calculated as follows:

$$z0=zf(t0)=e \cdot t0+g$$

By applying the above processes, even if the probe slides on a steep sloped surface or if the sample deforms when the probe and the sample contact one another, it becomes possible to perform a highly accurate measurement of the three-dimensional profile of the sample having eliminated the influence of sliding of the probe or deformation of the sample by measuring the height of the sample when the contact force between the probe and the sample is substantially zero.

At this time, as shown in FIG. 6, the probe and the sample are approximated even after they contact one another, until the contact force reaches a constant compress contact force and comes to a steady state, and thereafter, the probe and the sample are drawn away from one another and moved to the next measurement point. According to a further embodiment, the height signal at the point of time when the compress contact force becomes constant is recorded, and the difference between that height and the height data when the contact force is zero is calculated, according to which the following useful additional information can be obtained. That is, the above-mentioned height data difference is the distance in which the probe is pressed after the probe and the sample contact one another until the contact force reaches a constant value, so that it shows the degree of deformation of the sample or the sliding of the probe by contact force between the probe and the sample. If such height data is recorded at each measurement point, it becomes possible to achieve an effect of obtaining data related to the distribution of surface softness or the distribution of slide magnitude in addition to the three-dimensional profile data of the sample.

Figure 13:
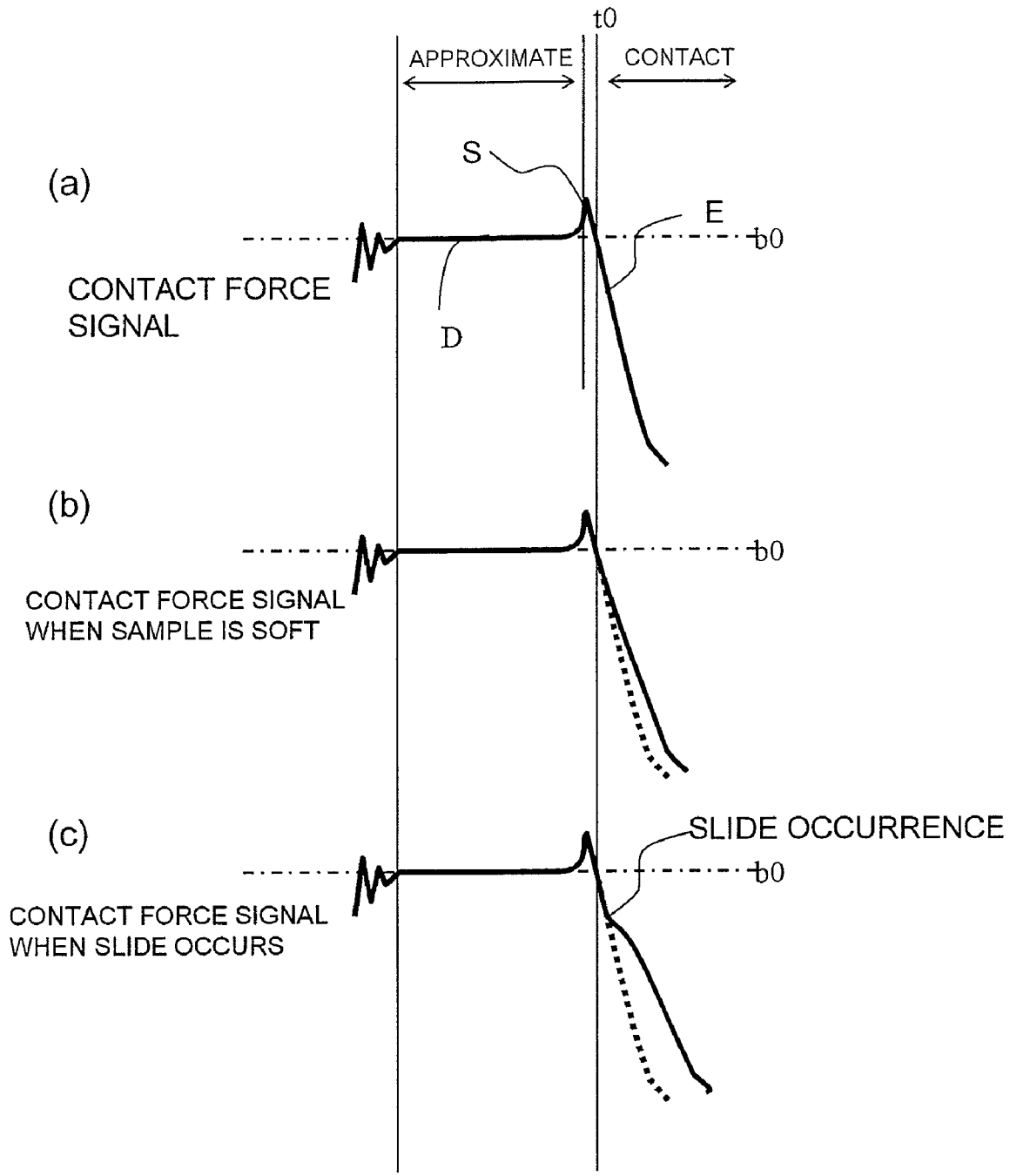
FIG. 13 is a view showing the aspect of change as described above of the profile of the contact force signal illustrated in FIG. 12, wherein FIG. 13(*a*) shows the normal state, FIG. 13(*b*) shows the state in which the sample is soft, and FIG. 13(*c*) shows the state in which sliding of the probe occurs.

Further, if the increase in contact force after the contact time is caused by the elastic deformation of the surface sample, the contact force is substantially proportional to the increase of height signal, whereas on the other hand, if the increase is caused by the sliding of the probe on a sloped surface, the relationship between the increase in contact force signal and the height signal is fluctuated unstably according to the state of occurrence of the slide. FIG. 13 is a drawing showing the change of contact force signal shape described in FIG. 12, wherein FIG. 13(a) shows the normal state, FIG. 13(b) shows the state in which the sample if soft, and FIG. 13(c) shows the state in which the sliding of the probe occurs, as described above. Through use of the above-described phenomenon, it becomes possible to isolate the influence of elastic deformation and slide from the measured data. For example, by calculating the correlation coefficient of the signal and the contact force signal, it becomes possible to perform measurement while isolating the influence of elastic deformation and slide.

Embodiment 2

Figure 8B:
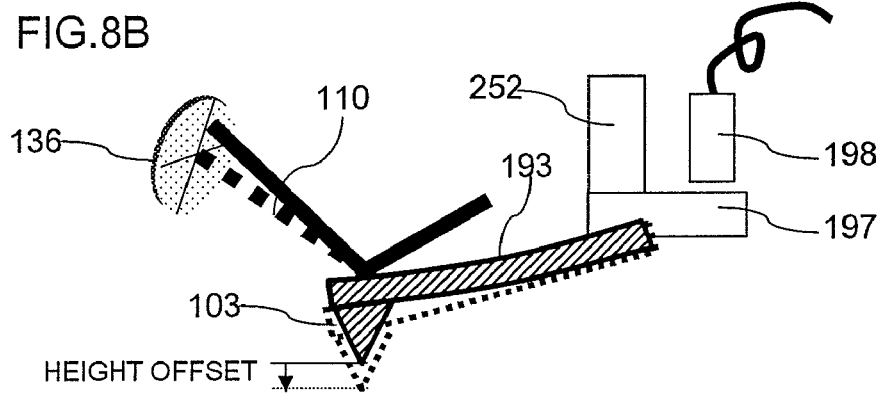

A second embodiment of the present invention will now be described, enabling the three-dimensional profile of the sample to be measured through enhanced accuracy even when the cantilever is deflected by thermal stress or the like when no force is applied between the probe and the sample. FIG. 8B is a view illustrating the state in which the shape of the cantilever 193 is deflected via thermal stress or the like applied to the cantilever when no force is applied between the probe and the sample. If the cantilever is deflected from the beginning as illustrated, the position of the tip of the probe is changed according to the deflection, so that when the height of the sample is measured in this state, an offset of height corresponding to the deflection occurs to the measured sample profile. This offset is fluctuated temporally according to the thermal stress or other conditions of the cantilever, and may cause error of the measured profile. For example, if the measurement is performed using a cantilever 193 deflected upward as illustrated in FIG. 8B, the cantilever mounting portion 197 must be lowered further before the probe 103 contacts the sample, so that the detected height of the sample surface is offset to the lower direction corresponding to the deflection.

In order to cope with this situation, embodiment 2 described hereafter will be performed. In this state, the light path of the laser beam 110 irradiated to the cantilever 193 is displaced as shown in FIG. 8B, by which the position of the spot on the detector 136 is moved, so that the contact force obtained by processing the output of the detector 136 via the contact force detection sensor 205 is also varied in proportion to the moved distance. Therefore, if the coefficient obtained by dividing the change of contact force signal by the change of position of the tip of the probe caused by deflection is herein after called optical lever sensitivity, it becomes possible to estimate the height offset of the tip of the probe by the following expression:

offset of tip height of probe=$b0$ offset by lever deflection during non-contact/optical lever sensitivity The offset is measured via the waveform analysis unit 261, and the measured value is received by the profile correction unit 262 where the sample surface height data when contact force between probe and sample is zero obtained as described in embodiment 1 is corrected to correspond to this offset per each measurement point, so that it becomes possible to obtain an accurate sample surface profile data having reduced the influence of deflection caused by thermal stress of the cantilever during the time when the probe is not in contact with the sample.

Figure 9:
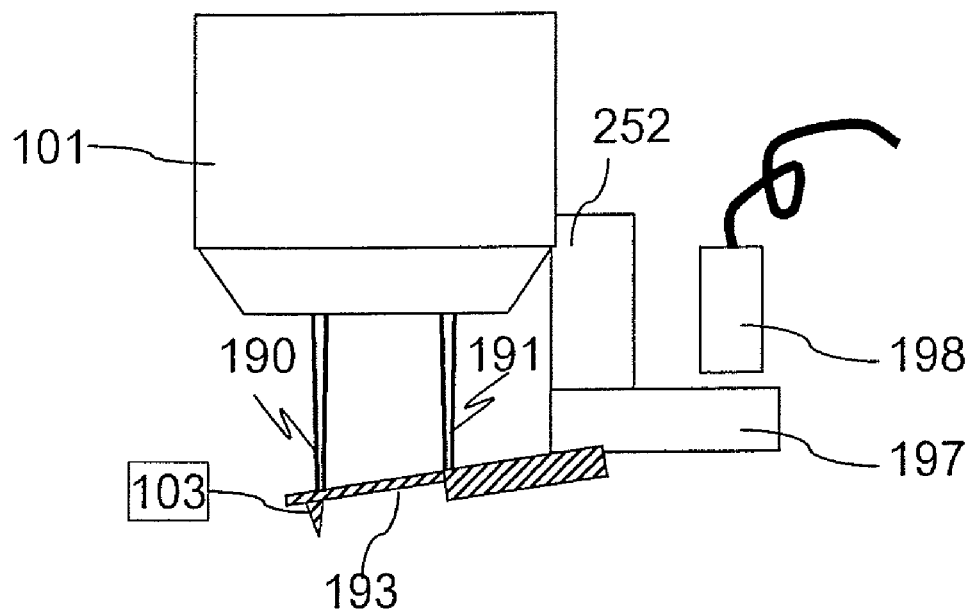
FIG. 9 is another view showing the method for correcting deflection of the cantilever due to thermal stress or the like according to the present invention.

Another method for estimating the above-mentioned offset will be described with reference to FIG. 9. Laser beams are irradiated on the base and the tip of the cantilever 193. By using laser beam 191 as reference light to measure the phase of laser 190 via laser interference, the distance data obtained from the measured phase shows the relative height of the tip of the cantilever 193 with the base of the cantilever set as reference. By using this value as offset of the tip height of the probe and performing a similar process, it becomes possible to obtain the accurate sample surface profile data having reduced the influence of deflection due to thermal stress or the like of the cantilever during the time when the probe is not in contact with the sample.

Yet another method is described with reference to FIG. 10, wherein the height signal z(t) is not obtained by measuring the height of the cantilever mounting unit 197 with a displacement detector, but a detection light 190 is irradiated on the tip of the cantilever 193 at the position where the probe is mounted, and through the principle of a laser interferometer, the height of this portion is directly measured to obtain the height signal z(t) and to use the same for detecting the sample height, by which accurate measurement is enabled without being influenced by deflection due to the thermal stress or the like of the cantilever when the probe is not in contact with the sample.

Embodiment 3

Figure 7:
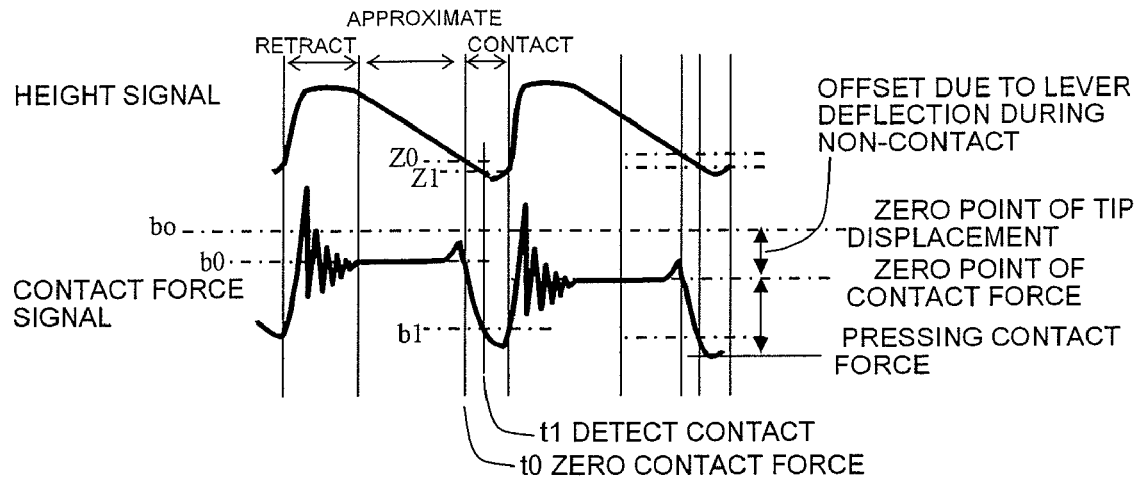
FIG. 7 is a view showing detection signals and a method for controlling the probe according to embodiment 3 of the present invention.

Next, an embodiment capable of increasing the measurement speed and further reducing the damage to the sample and the probe will be described with reference to FIG. 7. In FIG. 6, the probe and the sample are approximated under power control even after the probe and the sample come into contact with one another until the compress contact force of the probe and the sample reaches a constant level and comes to a steady state, and thereafter, the probe and the sample are drawn away and moved to the next measurement point. On the other hand, according to the present embodiment 3, when contact is detected at the point of time when the contact force signal reaches b1 via the waveform analysis unit 261 as shown in FIG. 7, the scan control unit 201 receives the data, and starts to drive the probe and the sample away from one another immediately after detecting the contact. According to this arrangement, it becomes possible to reduce the damage to the sample and the probe caused by the excessive pressing of the probe to the sample, and to enhance the measurement speed since the probe can start moving to the next measurement point swiftly.

According to the description of embodiments 1 and 2, the probe and the sample are approximated and separated in the state where the relative movement of the probe 103 and the sample 501 in the horizontal direction is stopped, so that by moving the probe laterally without dragging the probe with respect to the sample, the probe is not dragged on the sample. However, according to embodiment 3, since the contact time of the probe and the sample is shortened, it becomes possible to minimize the dragging of the probe on the sample even when the probe is approximated to the sample without stopping the relative movement of the probe and the sample in the horizontal direction. Therefore, even if the probe movement mechanism 252 or the sample stage 302 cannot perform swift horizontal acceleration and deceleration, high-speed measurement can still be realized.

Embodiment 4

Next, with reference to FIGS. 14, 15 and 16, a fourth embodiment of the present invention will be described in which the contact of the probe and the sample is detected with even higher sensitivity. As described in embodiment 1 with reference to FIGS. 1 and 6, the contact of the probe 103 and the sample 501 is detected by analyzing the output signal waveform of the contact force detection sensor 205 and detecting the moment of contact via the waveform analysis unit 201 focusing on the characteristic signal change that appears during the moment of contact. However, according to the conditions of the probe 103 and the sample 501, sometimes the horn-shaped signal change as shown in S of FIG. 12 is extremely small with respect to the output signal of the contact force detection sensor 205. Further, even when detecting whether the output signal of the contact force detection sensor 205 is varied greater than a threshold value with respect to level b0 of the planar portion D, the threshold value must be set with sufficient allowance with respect to the noise level of the planar portion D, so as not to erroneously detect contact of the probe 103 and the sample 501. In response to this problem, the fourth embodiment of the present invention for further improving the detection sensitivity of contact force will be described with reference to FIGS. 14, 15 and 16.

When the probe 103 contacts the sample 501 while the probe 103 is oscillating, the vibration of the probe is suppressed and damped drastically. By capturing this condition, the moment of contact can be detected with even higher sensitivity. Therefore, a vibration analysis unit 291 of FIG. 14 is added to the arrangement of FIG. 1. The vibration analysis unit 291 extracts the vibration component from the signal output from the contact force detection sensor 205, detects the moment of contact based on the changes in the vibration component and notifies the waveform analysis unit 261. Thereafter, similar to embodiment 1, the waveform analysis unit 261 can be used to obtain the height of the probe 103 in the state where the contact force between the probe 103 and the sample 501 is substantially zero via interpolation.

The vibration analysis unit 291 can obtain via AM detection the signal amplitude appearing in the contact force signal caused by residual vibration accompanying the vertical movement of the cantilever 193 and the probe 103 via the probe drive unit 202, or by thermal vibration caused by heat fluctuation, so as to detect the moment of time when the signal amplitude is drastically reduced. According to another example, the vibration analysis unit 291 can supply a vibration signal of the cantilever 193 to the probe drive unit 202 so as to excite vibration of the cantilever 193 and the probe 103, the vibration component appearing in the contact force signal corresponding to the excited frequency is detected via the vibration analysis unit 291 so as to detect the change in the amplitude of the vibration or the change in phase component caused by the probe 103 and the sample 501 coming in contact with one another.

The vibration signal can have a frequency close to the resonance frequency of the cantilever 193, or have a nonresonant frequency. If the vibration signal is set to have a frequency close to the resonance frequency, it is advantageous in that the detection sensitivity can be enhanced in proportion to the Q factor corresponding to the sharpness of the oscillation. However, the response of vibration is slow. On the other hand, if the vibration signal is set to a nonresonant frequency, there is an advantage in that the response of vibration detection is enhanced since the vibration is damped swiftly.

According to the above description, a vibration signal is added to the probe drive unit 202, but it is also possible to vibrate the Z-direction micromotion mechanism within the probe movement mechanism 252, or to provide a probe vibration mechanism using an independent piezoelectric element in addition to the Z-direction micromotion mechanism. Further, it is possible to irradiate a heating laser not shown on the cantilever 193 and to modulate the intensity of the laser beam via the vibration signal, to thereby cause time-varying thermally induced distortion to the cantilever 193 and to induce vibration of the cantilever. Furthermore, it is possible to use a magnetic body to form the cantilever 193 or the probe 103, or to form a portion thereof with a magnetic body, so as to excite the electromagnet not shown placed near the cantilever 193 via the vibration signal and to vibrate the cantilever 193 thereby.

Figure 15:
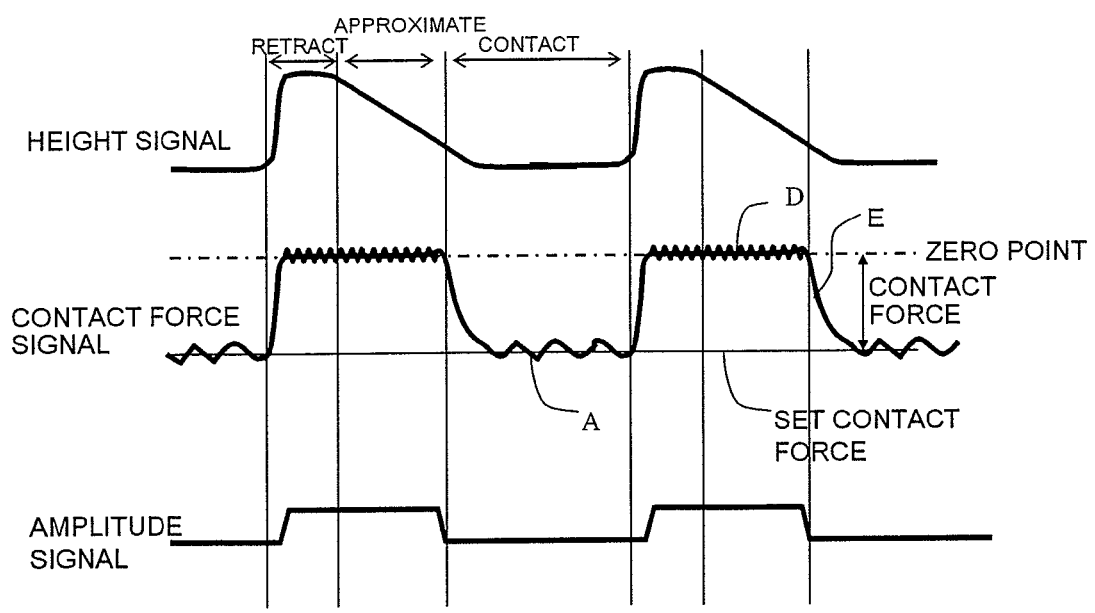
FIG. 15 is an embodiment showing the detection signals and a method for controlling the probe according to embodiment 4 of the present invention.

FIG. 15 shows the aspect of signals during the above-described operation. According to the signal illustrated in FIG. 5 described in embodiment 1, the attraction force between the probe 103 and the sample 501 is so large that a component denoting vibration occurs to the contact force signal after the retracting of the probe with respect to the sample (C of FIG. 5). Further, an horn-shaped signal appears in the contact force signal indicating that the probe 103 is attracted toward the sample 501 at the moment when the probe and the sample contact one another (between D and E of FIG. 5 and S of FIG. 12). On the other hand, FIG. 15 illustrates a case in which the attraction force is small. Therefore, the above-mentioned characteristic waveforms do not appear in the contact force signal. If the set contact force is lowered in this state, it is difficult to detect the moment of contact with high reliability even by applying the methods described in embodiments 1 through 3.

Figure 14:
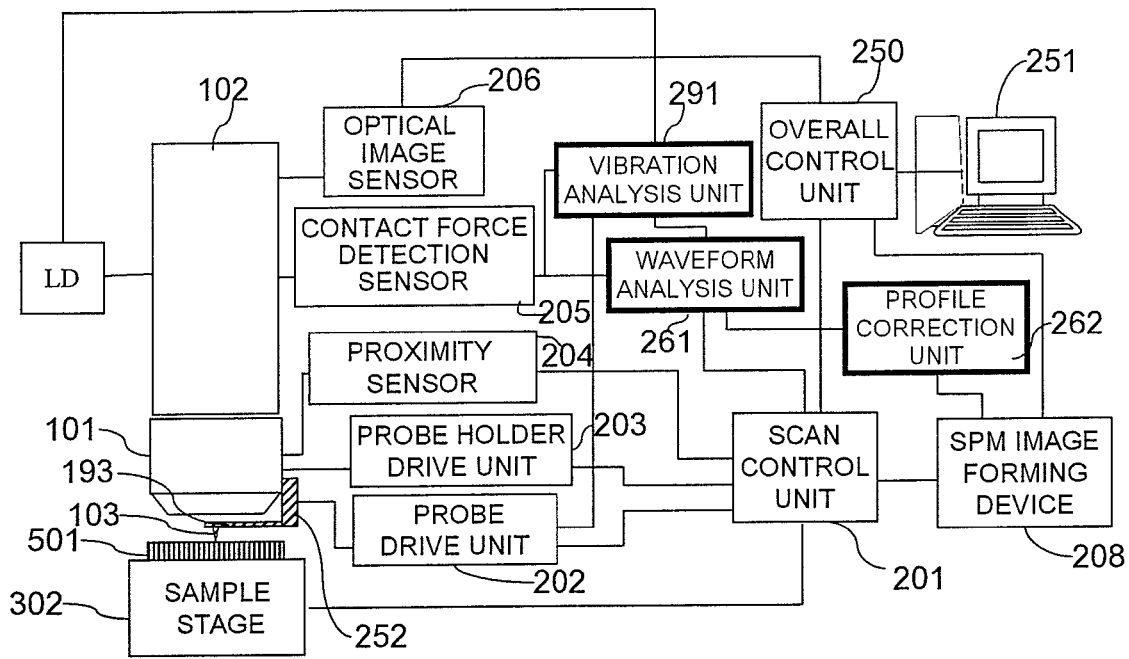
FIG. 14 is a view showing the overall configuration of a scanning probe microscope according to embodiment 4 of the present invention.

On the other hand, by adopting the method illustrated in FIG. 14, an AC signal corresponding to the vibration of the cantilever 193 is superposed on the contact force signal, as illustrated in section D of the contact force signal of FIG. 15. A transition as shown in FIG. 15 from section D to section D occurs to the signal at the moment when the probe 103 contacts the sample 501, and the superposed AC signal is attenuated. When the signal is converted into an amplitude signal via an RMS-DC amplifier (converting a root-mean-square of the signal into a DC signal level) or a lock-in amplifier corresponding to the excitation frequency, the amplitude signal is increased only during the period (D) when the probe 103 and the sample 501 contact one another, and the amplitude signal is reduced during other periods, as illustrated in the amplitude signal illustrated at the lower line of FIG. 15. Therefore, it is possible to detect the contact state of the probe 103 and the sample 501 stably by capturing the moment when the amplitude signal is reduced.

If the probe 103 is not released from the attraction toward the sample 501 when the probe is pulled up and moved to the next measurement point as shown in FIG. 4, the probe will be dragged on the sample 501 during movement, which causes deterioration of measurement accuracy and wearing of the probe 103. In order to overcome this problem, it is possible to separate the distance of the probe 103 and the sample 501 sufficiently with respect to the attraction force, but according to such method, the vertical movement of the probe 103 or the sample 501 is increased, and the measurement time is elongated. Therefore, by capturing the point where the amplitude signal is increased as shown in FIG. 15 to determine that the probe 103 has been released from the attraction toward the sample 501, so as to end the retraction movement of the probe 103 and the sample 501 (that is, to determine the relative separation distance of the cantilever 193 to the sample 501 at each measurement point), start the lateral movement of the probe 103 toward the next measurement point and approximate the probe vertically, it becomes possible to perform the measurement at higher speed. Further, the measurement can be performed at even higher speed by capturing via the waveform analysis unit 261 the phenomenon illustrated in FIG. 5 in which the status C of the contact force signal moving in the positive direction by the attraction force of the probe 103 and the sample 501 that appears in the contact force signal returns to zero point, so as to move the probe laterally to the next measurement point and perform approximation in the vertical direction.

Figure 16:
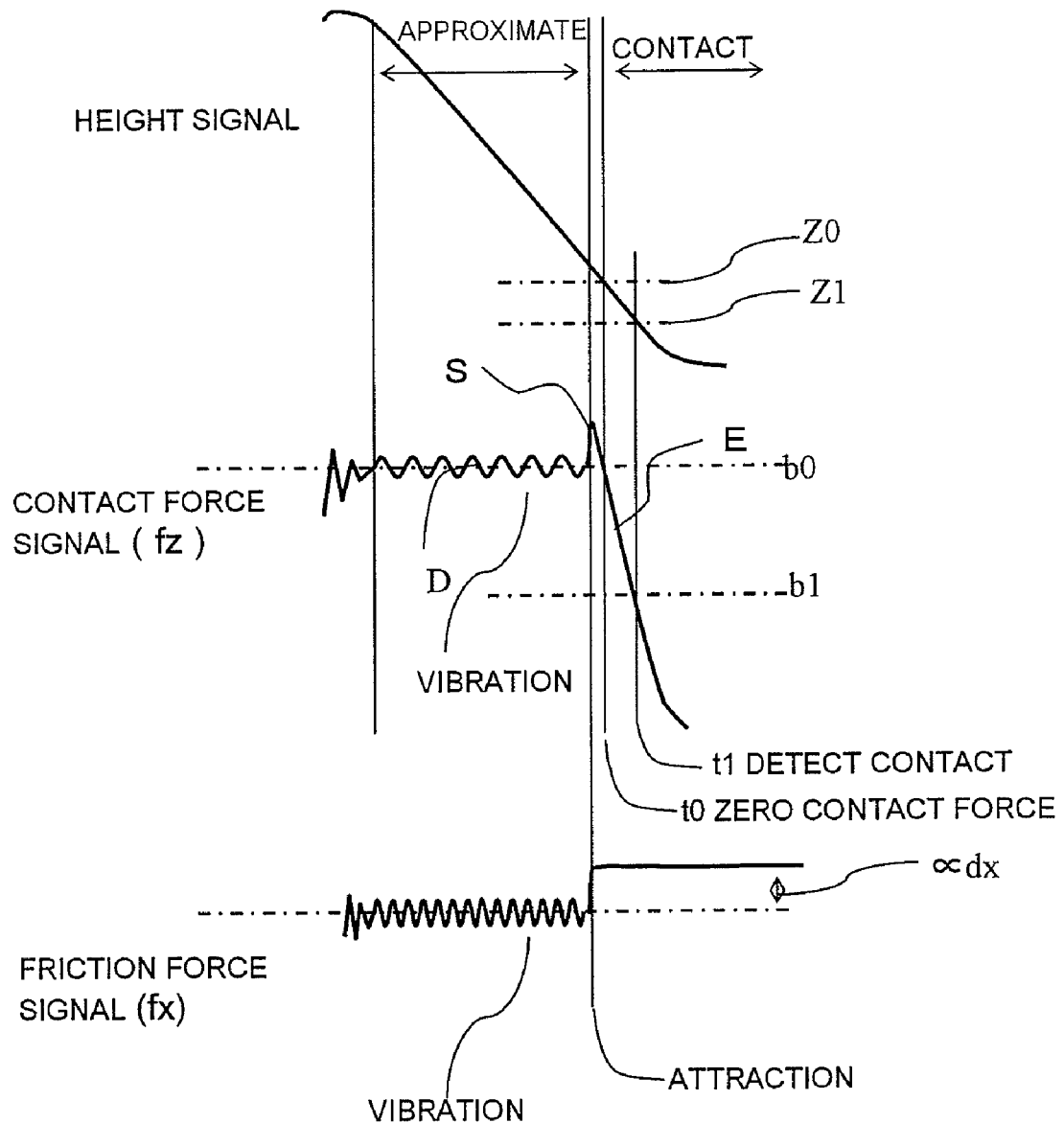
FIG. 16 is an enlarged view of the detection signal waveform before and after the contact of the probe and the sample according to FIG. 15.

FIG. 16 illustrates signals utilizing contact detection via the vibration of the cantilever 193 corresponding to the signal processing described heretofore in embodiment 1 with reference to FIG. 12. As illustrated, an AC signal corresponding to the vibration of the cantilever 193 appears in section D of the contact force signal. The processes performed via the waveform analysis unit 261 and the profile correction unit 262 subsequent to detecting contact with high sensitivity by analyzing the signal via the vibration analysis unit 291 are the same as those described with reference to FIG. 12.

Further, instead of using the contact force signal corresponding to the deflection of the cantilever 193 in the vertical direction, according to another arrangement, it is possible to use the torsional deformation of the cantilever 193, that is, a frictional force signal corresponding to the horizontal revolution of the probe 103, so as to detect the moment of contact using the phenomenon that the vibration varies by the probe 103 and the sample 501 coming into contact with one another. This aspect is illustrated in the lowermost line of FIG. 16. If the sloped surface at the measurement portion of the sample 501 is steep, the sensitivity of the horizontal force becomes higher than the vertical force of the force received by the probe 103 from the sample 501, so that in order to improve sensitivity, the contact should be detected based on the change of the vibration component appearing in the friction force signal rather than based on the change of vibration component appearing in the contact force signal.

According to another example, it is possible to detect the contact of the probe 103 and the sample 501 stably by detecting whether the change in either the vibration component appearing in the contact force signal or the vibration component appearing in the friction force signal exceeds a threshold value. According to another example, it is also possible to detect the contact of the probe 103 and the sample 501, by acquiring the square sum after suitably setting the sensitivities of the changes in the vibration component in the contact force signal and the vibration component in the friction force signal, and by detecting that the square sum signal traverses a threshold value. Thus, the contact of the probe 103 and the sample 501 can be detected with high sensitivity constantly, regardless of the angle of the slope at the measurement portion of the sample 501.

Moreover, if the probe 103 contacts the side wall portion of the sample 501 when retracting the probe 103 and moving the probe to the next measurement point as shown in FIG. 4, the contact can be detected with high sensitivity by performing the above-described contact detection of the probe 103 and the sample 501, so as to use the information to retract the probe 103 again and to realize a measurement operation capable of preventing the probe 103 from being dragged on the sample 501.

Embodiment 5

Figure 17:
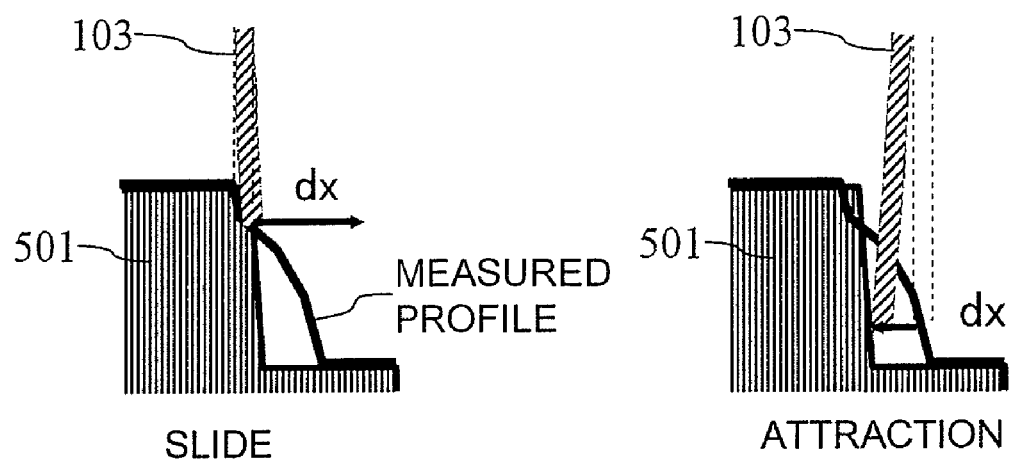
FIG. 17 is a view showing the aspect of the profile measurement error to be solved according to embodiment 5 of the present invention.

An embodiment capable of being combined with embodiments 1 through 4 so as to enable highly accurate measurement of the profile of the sample 501 by correcting the deformation of the probe 103 will now be described. As shown in FIG. 17, when the probe 103 contacts the steep sloped portion of the sample 501, even when the methods of embodiments 1 through 4 are applied to detect contact with high sensitivity, the probe 103 may still slide slightly on the sample due to delay of detection process, error or response delay of the control system.

Figure 18:
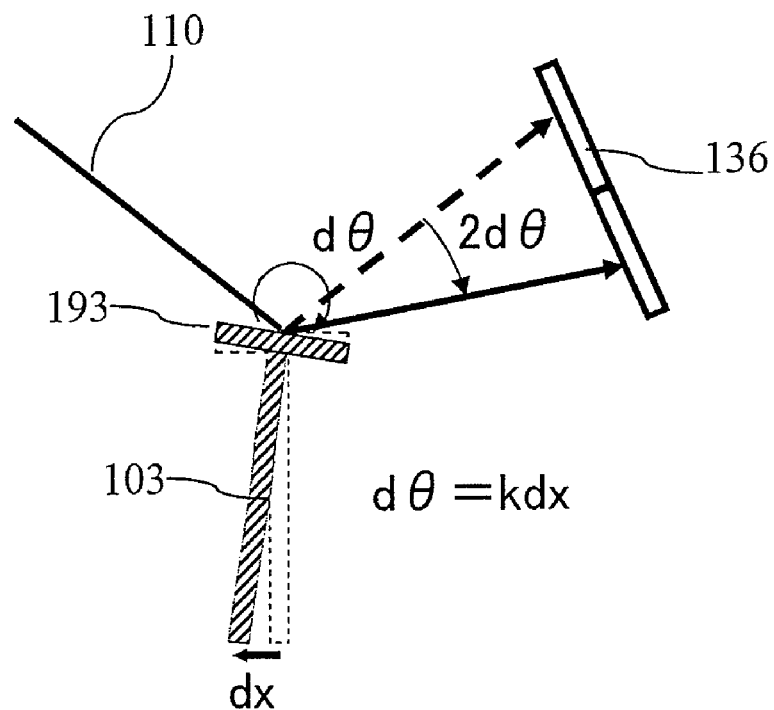
FIG. 18 is a view showing a method for detecting the torsion of the cantilever according to embodiment 5 of the present invention.

In this case, the tip of the probe 103 is moved laterally for distance dx, as shown in the left drawing of FIG. 17. In contrast, when the probe 103 is lowered along the side wall of the sample 501, the tip of the probe 103 is attracted toward the sample by the Van der Waal's forces or attraction such as electrostatic force operating between the probe 103 and the sample 501, by which the probe 103 is moved for distance dx toward the direction opposite to the sliding direction, as shown in the drawing on the right side of FIG. 17. As a result, the height of sample 501 is measured at a position displaced for distance dx from the position where the measurement should have been performed, so that the measurement result is distorted as shown in the measured profile of FIG. 17. On the other hand, by measuring the distance dx via the waveform analysis unit 261 as shown in FIG. 18 or FIG. 19, it becomes possible to correct this portion of the error in the x direction of the measurement data via the profile correction unit 262.

The measurement of dx will be performed as follows. When the tip of the probe 103 is moved for distance dx by external force, the probe 103 is deflected by the lateral force applied to the tip of the probe, and torque occurs to the cantilever 193, by which the torsion of the cantilever 193 occurs. The torsion quantity of the cantilever 193 depends on the ratio of the torsion rigidity of the cantilever 193 and the deflection rigidity of the probe 103, wherein the torsion quantity $d\theta$ of the cantilever 193 is proportional to the displacement dx of the tip of the probe 103, the relation of which can be expressed by $d\theta = kdx$. The torsion $d\theta$ creates a change of $2d\theta$ in the direction of light after the light 110 is reflected on the rear surface of the cantilever 193. The positional change of the spot of beam proportional to the above change occurs on the detector 136. The change in the position of the spot on the detector 136 caused by the torsion of the cantilever 193 appears in the direction orthogonal to the change of position of the spot caused by the deflection of the cantilever 193, so that by forming the detector 136 as a two-dimensional PSD (position sensitive device), a quadrant photodiode or an area image sensor, and by processing the output thereof via the contact force detection sensor 205, it becomes possible to detect the torsion of the cantilever simultaneously as the deflection of the cantilever 193 corresponding to the vertical contact force.

The torsion $d\theta$ of the cantilever 193 can be converted into the distance of movement dx caused by the deformation of the tip of the probe 103 in the waveform analysis unit 261. The distance of movement dx is illustrated in the friction force signal of FIG. 16 for sake of description. The distance of movement dx is notified to the profile correction unit 262, where it is used to correct the influence of deformation caused by sliding or attraction of the tip of the probe 103. Thus, it becomes possible to obtain a more accurate profile of the sample 501 in the SPM image forming device 208 with very little influence of deformation caused by the sliding or attraction of the tip of the probe 103.

Figure 19:
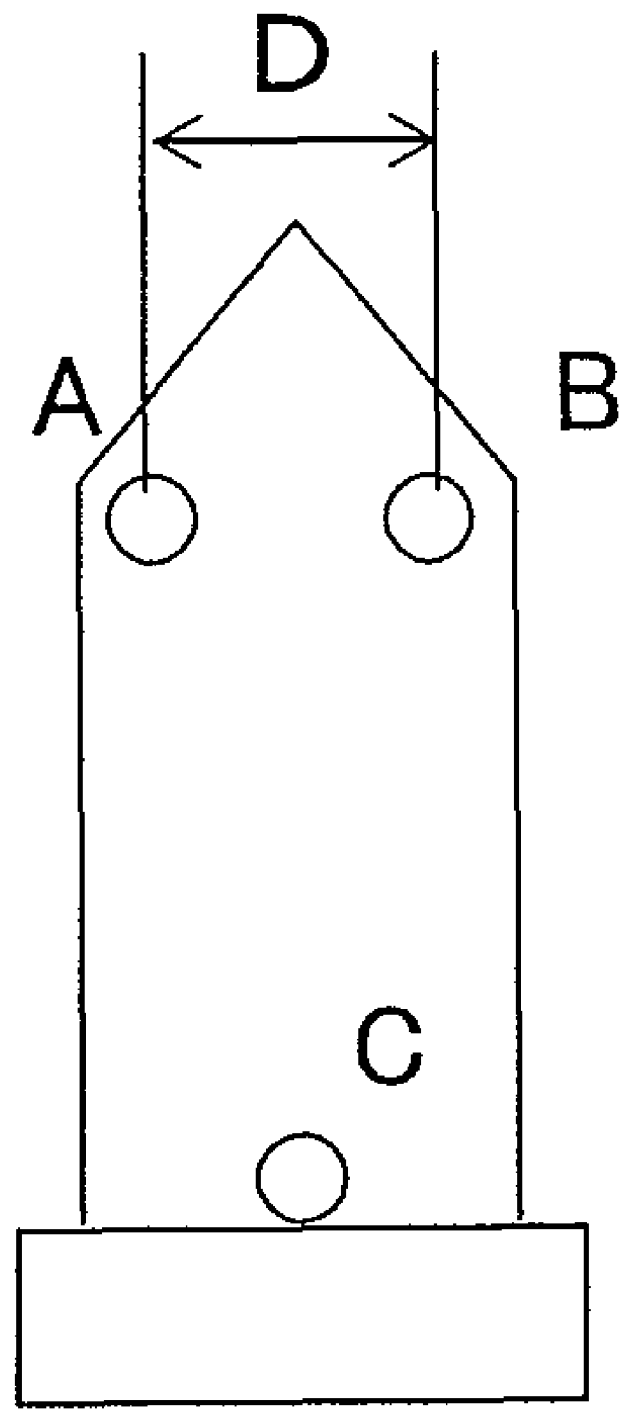
FIG. 19 is a view showing yet another method for detecting the torsion of the cantilever according to embodiment 5 of the present invention.

With reference to FIG. 19, yet another method for detecting the torsion of the cantilever 193 will be described. A spot of a laser displacement meter is irradiated on three portions A, B and C of the cantilever. According to a first arrangement in the laser displacement meter of FIG. 9, C is used as reference light 191 and two measurement lights 190 are irradiated on two portions A and B, so that the height of A and B are measured respectively using the base C of the cantilever as reference. If the respective height thereof is expressed as ZA and ZB, the deflection of the cantilever 193 can be detected by (ZA+ZB)/2, and if the distance between spots A and B is D, the torsion $d\theta$ of the cantilever 193 can be detected by (ZA−ZB)/D.

Figure 10:
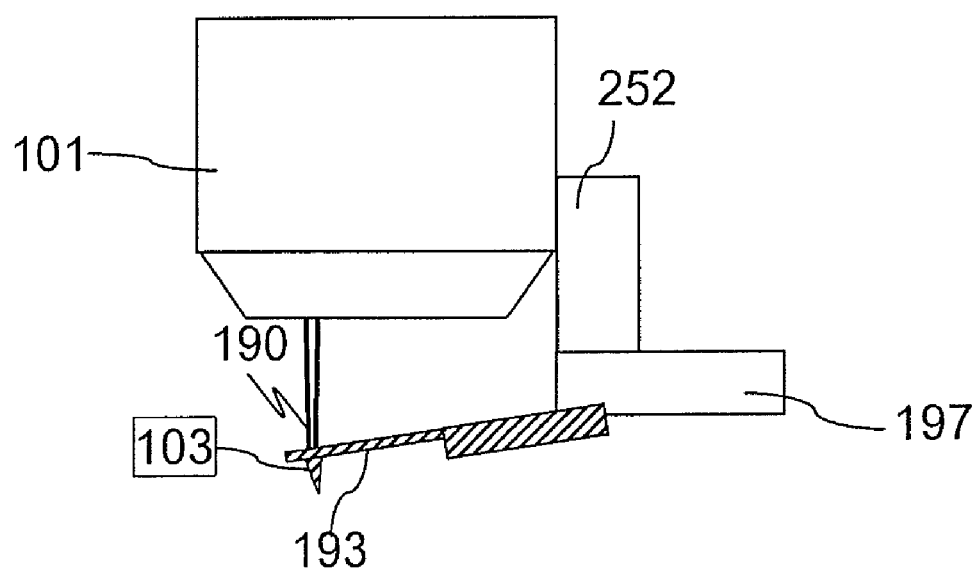
FIG. 10 is a view showing a measurement method that is not influenced by the deflection of the cantilever due to thermal stress or the like according to the present invention.

According to a second arrangement, the measurement light 190 of the laser displacement meter of FIG. 10 is irradiated on two portions A and B, wherein the respective height of A and B are measured using the height of the probe holder 101 as reference, which is expressed as ZA and ZB, the height of the tip of the cantilever 193 can be calculated by (ZA+ZB)/2, and if the distance between spots A and B is D, the torsion dθ of the cantilever 193 can be calculated by (ZA−ZB)/D.

The present invention enables to provide a scanning probe microscope capable of performing accurate profile measurement of samples including steep sloped surfaces and soft materials, and more specifically, capable of performing accurate profile measurement of samples such as semiconductors including steep sloped patterns and soft materials or samples such as biological samples composed of soft materials.

What is claimed is:

1. A scanning probe microscope having a driving mechanism capable of accurately controlling a relative position of a supporting unit of a cantilever with a probe disposed at a tip thereof and a sample stage for holding the sample, and a sensor for measuring the deformation condition of the cantilever, for measuring a three-dimensional surface profile and other surface distributions of a sample: wherein
    the scanning probe microscope measures the surface profile of the sample by detecting a change in profile appearing in a signal representing the deformation condition of the cantilever when the probe and the sample contact one another while approximating the relative distance of the probe and the sample, recording the height of the probe at that time, and performing the same process at various points on the sample while scanning horizontal positions via the probe, and
    a delay time due to signal processing of detection of the change in profile of the signal representing the deformation condition of the cantilever is considered, so as to enable the height of the probe to be measured at the point of time when the probe contacts the sample with substantially zero contact force.

2. The scanning probe microscope according to claim 1, wherein a change in profile of the signal representing the deformation condition of the cantilever is detected by the gradient of the signal exceeding a predetermined value.

3. The scanning probe microscope according to claim 1, wherein a change in profile of the signal representing the deformation status of the cantilever is detected by the rate of change of the gradient, that is, by the curvature exceeding a predetermined value.

4. The scanning probe microscope according to claim 1, wherein a change in profile of the signal representing the deformation condition of the cantilever is detected by a deviation with a reference value exceeding a predetermined value.

5. The scanning probe microscope according to claim 1, wherein a relative amount of change of position of a tip of the probe with respect to a base portion of the cantilever by the deformation of the cantilever caused by forces other than contact force when no force caused by contact with the sample is applied to the cantilever is obtained via conversion of the signal representing the deformation condition of the cantilever at that time, and the relative amount of change of position of the tip of the probe with respect to the base portion of the cantilever is used to correct the height of the surface of the sample measured from the height of the base portion of the cantilever.

6. The scanning probe microscope according to claim 1, wherein the height of the probe when the probe contacts the sample is measured using a detector capable of directly measuring the height of the tip of the probe.

7. The scanning probe microscope according to claim 6, wherein the detector capable of directly measuring the height of the tip of the probe performs measurement by interference of a laser beam irradiated and reflected on a tip portion with a reference light.

8. The scanning probe microscope according to claim 1, wherein a change in profile of the signal representing the deformation condition of the cantilever is detected by the change of a component corresponding to the vibration of the cantilever in the signal.

9. The scanning probe microscope according to claim 8, wherein the change of the component corresponding to the vibration of the cantilever is either the change of amplitude, phase or frequency of the vibration in which the tip of the probe moves in the vertical direction, or the change of amplitude, phase or frequency of the vibration in which the tip of the probe moves in the horizontal direction, or a combination of both.

10. The scanning probe microscope according to claim 8, further comprising a piezoelectric element, an electromagnet or a laser for causing vibration of the cantilever.

11. A scanning probe microscope having a driving mechanism capable of accurately controlling a relative position of a supporting unit of a cantilever with a probe disposed at a tip thereof and a sample stage for holding the sample, and a sensor for measuring the deformation condition of the cantilever, for measuring a three-dimensional surface profile and other surface distributions of a sample: wherein
    the scanning probe microscope measures the surface profile of the sample by detecting a change in profile appearing in a signal representing the deformation condition of the cantilever when the probe and the sample contact one another while approximating the relative distance of the probe and the sample, recording the height of the probe at that time, and performing the same process at various points on the sample while scanning horizontal positions via the probe, and
    when the probe and the sample are separated, the separation of the probe from the sample is detected by the change in the component corresponding to the vibration of the cantilever in the signal representing the deformation condition of the cantilever, and determining the relative amount of elevation of the cantilever with respect to the sample.

12. A scanning probe microscope having a driving mechanism capable of accurately controlling a relative position of a supporting unit of a cantilever with a probe disposed at a tip thereof and a sample stage for holding the sample, and a sensor for measuring the deformation condition of the cantilever, for measuring a three-dimensional surface and profile and other surface distributions of a sample: wherein
    the scanning probe microscope measures the surface profile of the sample by detecting a change in profile appearing in a signal representing the deformation condition of the cantilever when the probe and the sample contact one another while approximating the relative distance of the probe and the sample, recording the height of the probe at that time, and performing the same process at various points on the sample while scanning horizontal positions via the probe, and
    when the probe is moved to a next measurement point and the probe and the sample are not in contact with one another, the unintended contact of the probe and the sample is detected by the change in the component corresponding to the vibration of the cantilever in the signal representing the deformation condition of the cantilever.

13. A scanning probe microscope having a driving mechanism capable of accurately controlling a relative position of a supporting unit of a cantilever with a probe disposed at a tip thereof and a sample stage for holding the sample, and a sensor for measuring the deformation condition of the cantilever, for measuring a three-dimensional surface profile and other surface distributions of a sample:
   wherein
      the scanning probe microscope measures the surface profile of the sample by detecting a change in profile appearing in a signal representing the deformation condition of the cantilever when the probe and the sample contact one another while approximating the relative distance of the probe and the sample, recording the height of the probe at that time, and performing the same process at various points on the sample while scanning horizontal positions via the probe, and
   a horizontal measurement error caused by deformation of the probe is estimated based on a signal indicating torsion of the cantilever in the signal representing the deformation condition of the cantilever, and the horizontal measurement error is corrected.

* * * * *